Patented July 1, 1930

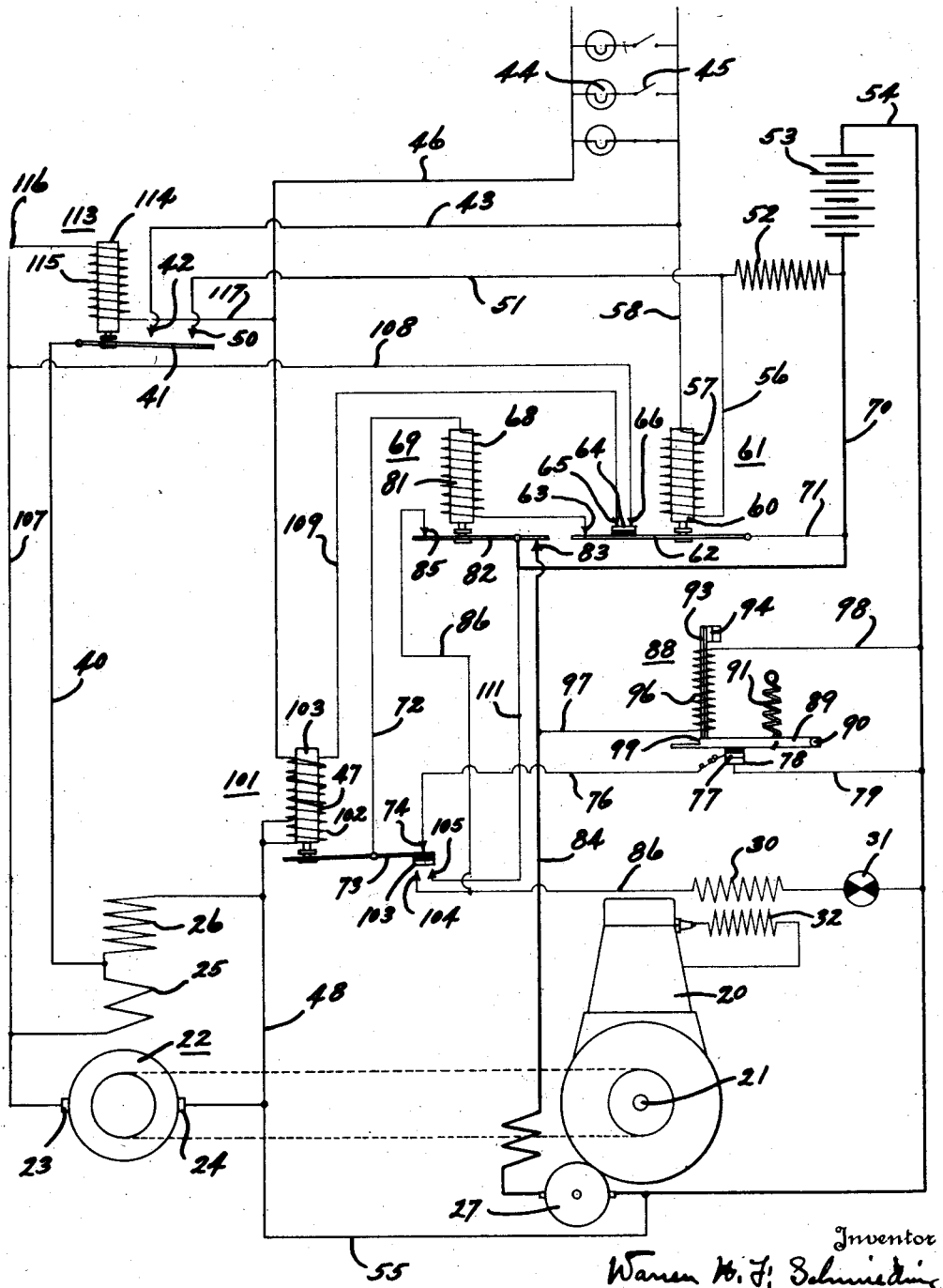

1,768,637

UNITED STATES PATENT OFFICE

WARREN H. F. SCHMIEDING, OF DAYTON, OHIO, ASSIGNOR TO DELCO-LIGHT COMPANY, OF DAYTON, OHIO, A CORPORATION OF DELAWARE

ELECTRICAL APPARATUS

Application filed October 31, 1927. Serial No. 229,948.

The present invention relates to electrical generating systems including a prime mover, such as an internal combustion engine, electrical apparatus which is adapted to supply current to a generating circuit, and a source of current such as a battery for rendering the prime mover operable to drive the electrical apparatus.

One of the objects of the present invention is to provide improved control means for rendering the prime mover operative and for connecting the apparatus with the generating circuit.

Another object is to provide an improved and novel arrangement of elements of control mechanism and circuits to perform the foregoing function.

Further objects and advantages of the present invention will be apparent from the following description, reference being had to the accompanying drawing, wherein a preferred form of the present invention is clearly shown.

The figure of the drawing is a wiring diagram illustrating the present invention.

In the drawing 20 designates a prime mover having a shaft 21 which drives a relatively high voltage generator 22 having main brushes 23 and 24 connected with the armature of the generator, and having a series field winding 25 and a shunt field winding 26.

For the purpose of illustrating one form of the present invention, there is shown a relatively low voltage series motor 27, which is normally disconnected from the engine, but which may be connected therewith for cranking the same. As various devices for automatically connecting and disconnecting the starting motor are well-known to those skilled in the art, illustration thereof is deemed unnecessary. One form of mechanical connection which may be used with this invention is described and claimed in the copending application of Frank F. Starr, Serial No. 47,717, filed August 3, 1925.

The engine ignition apparatus comprises an ignition coil primary 30, an ignition timer 31, and an ignition coil secondary 32 which is connected with the engine spark plug.

Two generating circuits are herein shown, namely, a relatively high voltage work circuit and a low voltage battery charging circuit. The relatively high voltage work circuit, which is supplied by the generator 22, includes a series field 25, a wire 40, a pivoted contact 41, contact 42, wire 43, translating devices 44, which are individually controlled by switches 45, wire 46, coil 47, and a wire 48. The battery charging circuit includes the series field 25, wire 40, contact 41, contact 50, wire 51, battery charging resistance 52, a battery 53, wire 54 and wire 55 which is connected with wire 48.

To start the engine automatically in response to a demand for current in the work circuit, one of the switches 45 is closed, thereby causing current to flow from the low voltage battery 53 through the following circuit: Resistance 52, wire 56, magnet coil 57, wires 58 and 43, switch 45, translating device 44, wire 46, coil 47, wires 48, 55 and 54 to the opposite side of the battery. It will be noted that the low voltage battery 53 is connected across the high voltage work circuit containing the high voltage translating device 44, and since such translating devices are relatively high resistance, the current flow in the circuit is small. The coil 57, however, is wound so that it will attract its armature 60 when the translating circuit is closed. Therefore when there is a demand in the translating or work circuit this relay, which is herein termed a starting switch relay 61, will be actuated. The armature 60 of relay 61 actuates a contact 62 which is arranged to engage the contact 63 and carries an insulated contact 64, which latter contact is arranged to engage contacts 65 and 66. When contact 62 engages contact 63 a magnet 68 of the starting switch 69 is energized over the following circuit: Battery 53, wire 70, wire 71, contacts 62 and 63, coil 68, wire 72, movable contact 73, contact 74, wire 76, movable contact 77, contact 78, wire 79 and wire 54 to the opposite side of the battery. When coil 68 is energized the armature 81 and switch 69 will be attracted and will cause a movable contact 82 to engage a contact 83 to complete the following cranking circuit to the motor 27: Wire 70, contact 82, contact 83, series motor 27 and wire 54 to the opposite side of the battery. The attraction of armature 81 of switch 69 will cause the contact 82 to engage a contact 85 to complete the "starting" ignition circuit. This circuit branches from contact 82 to contact 85 whence the current flows over a wire 86 to the primary ignition coil 30, timer 31 and wire 54. Thus the engine will be started by supplying ignition thereto and by cranking the engine by the starting motor 27.

If, after connecting the starting motor 27 with the battery 53 for cranking the engine, and the latter should not become self operating within a predetermined length of time, depletion of the battery is prevented by disconnecting the motor from the battery by a cranking cut-out 88. This cranking cut-out includes the contacts 77 and 78, which form a part of the circuit to the starting switch coil 68. The contact 77 is attached to a lever 89 which is pivoted at 90 and is urged upwardly by a spring 91. Upward movement of the lever 89 is normally restrained by its engagement with the lower end of a thermostatic blade 93 which is fixed at 94. The blade 93 is in heat-receiving relation to a heating coil 96 and this coil is connected across the battery terminals, one end of said coil being connected by a wire 97 to the wire 84 and the other end thereof being connected by a wire 98 with the wire 54. Thus it is apparent that when current is supplied to the starting motor the heating coil 97 is energized, and if the cranking of the engine should continue for an abnormal period, the bi-metal blade 93 will be heated sufficiently to cause the lower end thereof to bend toward the left, as viewed in the drawing, until the lower end of the blade 93 moves past the shoulder 99 of lever 89. When this occurs, the lever 89 moves upwardly and causes contact 77 to separate from contact 78 to thus interrupt the flow of current through the starting switch magnet coil 68 whereby contact 82 will be separated from contact 83 to thus interrupt the cranking circuit, while at the same time interrupt the ignition circuit.

During normal operation, the engine becomes self operative before the cranking circuit is interrupted. However, it is desirable to interrupt the cranking circuit after the engine is self operative and this is accomplished by a stop-cranking relay 101 which includes the coil 47 and a coil 102. The coil 102 is arranged to attract an armature 103 to cause the contact 73 to be separated from contact 74 and cause an insulated contact 103 to engage contacts 104 and 105. The coil 102 is connected across the terminals of the generator 22 by a wire 107, wire 108, contacts 66, 64 and 65 of starting switch relay 61, wire 109, coil 102 and wire 48 to the opposite side of the generator. When the generator voltage reaches a certain value (less than normal), the coil 102 will be energized sufficiently to attract the armature 103 whereby the circuit of the starting switch magnet 68 will be interrupted at 74 to thus interrupt the cranking circuit of the motor 27 and the cranking cut-out circuit by separating contact 82 from 83. When the contact 82 is moved out of engagement with 83 to interrupt the cranking circuit, it also separates from contact 85 to interrupt the ignition circuit at this point. However, prior to the separation of contact 82 from contact 85 a "running" ignition circuit is established by the engagement of contact 103 with contacts 104 and 105 as follows: Battery 53, wire 70, wire 111, contacts 105, 103 and 104, which latter contact is connected with the wire 86 which in turn is connected with primary ignition coil 30. It is apparent therefore that the engine control device, namely, the ignition circuit, is maintained through the stop-cranking relay 101.

It is to be understood that when relay 101 operates, the generator 22 is not up to full voltage, but when the generator does attain substantially its full relatively high voltage, load switch 113 will be brought into operation. This load switch includes the movable contact 41 and actuating armature 114 and a coil 115. This coil is connected across the generator 22 by wires 107 and 116 on one side of the generator and by wires 117 and 46, coil 47 and wire 48 on the other side of the generator; and when the voltage across the terminals of the generator attain a certain value, coil 115 will be energized sufficiently to attract the armature 114 to cause contact 41 to engage contacts 50 and 42 to thus complete the generating circuits including the battery and the translating devices.

Contact 41 is arranged to engage contact 50 an instant sooner than it engages contact 42 in order to prevent a reversal of current in coil 57 which would be the case if current were permitted to flow first through contact 42 and wire 43. When contact 41 engages contact 42 the coil 57 will be short-circuited since the resistance of wire 43 is less than the resistance offered by coil 57 which coil is now connected in parallel with wire 43. The armature 60 of starting switch relay will then drop to cause contact 64 to separate from contacts 65 and 66 to thus interrupt the circuit to the coil 102 of stop-cranking relay 101. At this time, however, the coil 47, which is in the work circuit will be energized and will maintain the contact 103 in engagement with contacts 104 and 105 whereby ignition is supplied to the engine. It is apparent that the entire system is now under the control of coil 115 of relay 113 and coil 47 of relay 101. As long as current is in demand in the work circuit, the coil 47 will maintain the ignition circuit closed, but as soon as the demand ceases, the coil 47 will be de-energized and the contact 103 will be separated from contacts 104 and 105 to interrupt the ignition circuit and thereby stop the engine and generator 22.

By virtue of the present system the cranking circuit is interrupted substantially as soon as the engine becomes self operative. The coil 102 can be arranged to operate at a relatively low voltage, and the coil is subjected to a relatively high voltage for only a short interval at a time, namely, that time required to bring the engine from said relatively low voltage to its normal high voltage at which time the circuits of the coil 102 will be interrupted by the separation of contact 64 from contacts 65 and 66. Thus it is apparent that if the high voltage is impressed across the low voltage coil for only a relatively short interval of time said coil may be arranged to operate at a relatively low voltage and in this manner the cranking circuit can be interrupted substantially as soon as the engine is self operative.

While the form of embodiment of the invention as herein disclosed, constitutes a preferred form, it is to be understood that other forms might be adopted, all coming within the scope of the claims which follow.

What is claimed is as follows:

1. An electrical generating system, comprising in combination, a prime mover; a source of current; a generating circuit; electrical apparatus for rendering the prime mover operable and for supplying current to the generating circuit; a prime mover control device; a plurality of control circuits for said device; control mechanism for connecting the electrical apparatus with the source of supply and for rendering one of said control circuits for said device operative; a voltage coil energized by said apparatus for rendering another of said control circuits for said device operative; and a coil in series relation with the electrical apparatus and the generating circuit for maintaining the latter control circuit operative.

2. An electrical generating system, comprising in combination, a prime mover; a source of current; a generating circuit; electrical apparatus for rendering the prime mover operable and for supplying current to the generating circuit; a prime mover control device; a plurality of control circuits for said device; control mechanism for connecting the electrical apparatus with the source of supply and for rendering one of said control circuits for said device operative; a voltage coil energized by said apparatus for rendering another of said control circuits for said device operative; and a coil in series relation with the electrical apparatus and the generating circuit for maintaining the latter control circuit operative, and means for connecting the electrical apparatus with the generating circuit and for rendering the control mechanism inoperative.

3. An electrical generating system, comprising in combination, a prime mover; a source of current; a generating circuit; electrical apparatus for rendering the prime mover operable and for supplying current to the generating circuit; a prime mover control device; control mechanism for connecting the electrical apparatus with the source of supply and for controlling said device; a voltage coil energized by said apparatus for controlling said device; a circuit for said coil controlled by said control mechanism; means responsive to prime mover operation for rendering said control mechanism and said voltage coil inoperative and for maintaining said device operative.

4. An electrical generating system, comprising in combination, a prime mover; a source of current; a circuit; electrical apparatus for rendering the prime mover operable and for supplying current to a generating circuit; a prime mover control device; control mechanism for connecting the electrical apparatus with the source of supply and for controlling said device; a voltage coil energized by said apparatus for controlling said device; a circuit for said coil controlled by said control mechanism; means responsive to prime mover operation for rendering said control mechanism and said voltage coil inoperative; and means for maintaining said device operative as long as current is supplied by the electrical apparatus to the generating circuit.

5. An electrical generating system, comprising in combination, a prime mover; a source of current; a circuit; electrical apparatus for rendering the prime mover operable and for supplying current to a generating circuit; a prime mover control device; control mechanism for connecting the electrical apparatus with the source of supply and for controlling said device; a voltage coil adapted to be energized by said apparatus for controlling said device; a circuit for said coil controlled by said control mechanism; means responsive to prime mover operation for rendering the control mechanism and said voltage coil inoperative; and a coil in series with the electrical apparatus and the generating circuit for supplementing said coil to maintain the control device operative.

6. An electrical generating system, comprising in combination, an internal combustion engine; a battery; electrical apparatus for cranking the engine and for supplying current, an engine cranking circuit, and a generating circuit; an engine control device; control mechanism for establishing the cranking circuit and for rendering the control device operative; and means responsive to engine operation for rendering said control mechanism inoperative, said means including a relay having a low voltage coil connected in shunt with the electrical apparatus and adapted to interrupt the cranking circuit and establish a secondary control for the control device, and a coil in series with the generating circuit for maintaining said secondary control, and means responsive to engine operation for rendering said series coil effective and for rendering the shunt coil ineffective.

7. An electrical generating system, comprising in combination a prime mover; a source of current; a generating circuit; an electrical apparatus for rendering the prime mover operable and for supplying current to the generating circuit; a prime mover control device; a plurality of control circuits for said device; control mechanism for connecting the electrical apparatus with the source of supply and for rendering one of said control circuits for said device operative; a voltage coil energized by said apparatus for rendering another of said control circuits for said device operative; and a coil in series relation with the electrical apparatus and the generating circuit for maintaining the latter for said control circuits operative; and means operated subsequently to said voltage coil for rendering the first of said control circuits for the device inoperative.

In testimony whereof I hereto affix my signature.

WARREN H. F. SCHMIEDING.